United States Patent
Ueno

(10) Patent No.: US 7,904,236 B2
(45) Date of Patent: Mar. 8, 2011

(54) ELECTRONIC APPARATUS AND ELECTRONIC SYSTEM

(75) Inventor: Hiroshi Ueno, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 1104 days.

(21) Appl. No.: 11/646,478

(22) Filed: Dec. 28, 2006

(65) Prior Publication Data
US 2008/0158791 A1 Jul. 3, 2008

(51) Int. Cl.
*G01C 21/00* (2006.01)
(52) U.S. Cl. .................. 701/200; 307/10.1
(58) Field of Classification Search .............. 701/200; 307/10.1, 10.3, 9.1; 296/37.13, 37.8; 340/426.34; 455/344–346, 348, 350
See application file for complete search history.

(56) References Cited

U.S. PATENT DOCUMENTS

| | | | |
|---|---|---|---|
| 4,178,319 A | 12/1979 | Chattha | |
| 4,389,639 A | 6/1983 | Torii et al. | |
| 4,542,421 A | 9/1985 | Fujibayashi | |
| 4,748,685 A * | 5/1988 | Rozanski, Jr. | 455/218 |
| 5,493,479 A | 2/1996 | Takahashi | |
| 5,510,957 A | 4/1996 | Takagi | |
| 5,537,673 A | 7/1996 | Nagashima et al. | |
| 5,592,389 A | 1/1997 | La Rue et al. | |
| 5,627,547 A | 5/1997 | Ramaswamy et al. | |
| 5,705,975 A | 1/1998 | Serino et al. | |
| 5,733,714 A | 3/1998 | McCulloch et al. | |
| 5,774,828 A | 6/1998 | Brunts et al. | |
| 5,794,164 A | 8/1998 | Beckert et al. | |
| 5,845,282 A | 12/1998 | Alley et al. | |
| 5,862,468 A | 1/1999 | Kim | |
| 5,917,435 A | 6/1999 | Kamiya et al. | |
| 5,941,933 A | 8/1999 | Miyake et al. | |
| 5,964,821 A | 10/1999 | Brunts et al. | |
| 5,999,126 A | 12/1999 | Ito | |
| 6,009,355 A | 12/1999 | Obradovich et al. | |
| 6,023,290 A | 2/2000 | Seita | |
| 6,055,478 A | 4/2000 | Heron | |
| 6,091,956 A | 7/2000 | Hollenberg | |
| 6,093,977 A | 7/2000 | Fujita et al. | |
| 6,119,060 A | 9/2000 | Takayama et al. | |
| 6,125,326 A | 9/2000 | Ohmura et al. | |
| 6,136,507 A | 10/2000 | Morigaki | |
| 6,148,253 A | 11/2000 | Taguchi et al. | |

(Continued)

FOREIGN PATENT DOCUMENTS

DE 198 03 178 A1 7/1999

(Continued)

OTHER PUBLICATIONS

U.S. Appl. No. 11/645,629, filed Dec. 27, 2006.

(Continued)

*Primary Examiner* — Dalena Tran
(74) *Attorney, Agent, or Firm* — Oliff & Berridge, PLC

(57) ABSTRACT

An electronic apparatus to which a portable apparatus is attachable, the electronic apparatus including: a second connecting line connected to a first connecting line provided in the portable apparatus; a detector detecting an attachment of the portable apparatus, when the second connecting line is electrically connected to the first connecting line, and detecting a detachment of the portable apparatus, when the second connecting line is electrically disconnected from the first connecting line; and a resent transmitter transmitting a rest signal to the portable apparatus through the second connecting line and the first connecting line.

5 Claims, 12 Drawing Sheets

U.S. PATENT DOCUMENTS

| | | | |
|---|---|---|---|
| 6,150,925 | A | 11/2000 | Casazza |
| 6,163,079 | A | 12/2000 | Miyazaki et al. |
| 6,202,008 | B1 | 3/2001 | Beckert et al. |
| 6,208,932 | B1 | 3/2001 | Ohmura et al. |
| 6,243,645 | B1 | 6/2001 | Moteki et al. |
| 6,303,266 | B1 | 10/2001 | Okino et al. |
| 6,405,049 | B2 | 6/2002 | Herrod et al. |
| 6,417,786 | B2 | 7/2002 | Learman et al. |
| 6,421,606 | B1 | 7/2002 | Asai et al. |
| 6,653,049 | B2 | 11/2003 | Pavelchek et al. |
| 6,681,176 | B2 | 1/2004 | Funk et al. |
| 6,701,161 | B1 | 3/2004 | Wendling |
| 6,791,844 | B2 | 9/2004 | Tobishima et al. |
| 6,803,168 | B1 | 10/2004 | Padmanaban et al. |
| 6,816,783 | B2 | 11/2004 | Hashima et al. |
| 6,993,615 | B2 | 1/2006 | Falcon |
| 7,006,845 | B2 | 2/2006 | Simon |
| 7,016,986 | B2 | 3/2006 | Fasolt |
| 7,062,378 | B2 | 6/2006 | Krull et al. |
| 7,079,863 | B2 | 7/2006 | Chikaishi |
| 7,117,286 | B2 | 10/2006 | Falcon |
| 7,184,003 | B2 | 2/2007 | Cupps et al. |
| 7,215,950 | B2 | 5/2007 | Mazzara, Jr. et al. |
| 7,216,242 | B2 | 5/2007 | Glass et al. |
| 7,222,207 | B2 | 5/2007 | Falcon |
| 7,650,230 | B1 * | 1/2010 | Laverick et al. ............... 701/200 |
| 2001/0018663 | A1 | 8/2001 | Dussell et al. |
| 2002/0024597 | A1 | 2/2002 | Arai et al. |
| 2002/0068549 | A1 | 6/2002 | Tendler |
| 2002/0137541 | A1 | 9/2002 | Lepley et al. |
| 2002/0152027 | A1 | 10/2002 | Allen |
| 2003/0022624 | A1 | 1/2003 | Sato |
| 2003/0103634 | A1 | 6/2003 | Ito |
| 2003/0215736 | A1 | 11/2003 | Oberlander et al. |
| 2004/0058656 | A1 | 3/2004 | Chikaishi |
| 2004/0204159 | A1 | 10/2004 | Van Bosch |
| 2004/0247280 | A1 | 12/2004 | Izawa |
| 2005/0139731 | A1 | 6/2005 | Park et al. |
| 2006/0031617 | A1 | 2/2006 | Falcon |
| 2006/0211256 | A1 | 9/2006 | Takei et al. |
| 2008/0130206 | A1 | 6/2008 | Itoh |
| 2008/0161047 | A1 | 7/2008 | Witkowski et al. |

FOREIGN PATENT DOCUMENTS

| | | |
|---|---|---|
| EP | 0 507 990 A1 | 10/1992 |
| EP | 0 580 157 A1 | 1/1994 |
| EP | 0 658 011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 6/1956 |
| JP | Y-63-018184 | 5/1988 |
| JP | A 04-238218 | 8/1992 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | A 2001-015936 | 1/2001 |
| JP | A-2001-052473 | 2/2001 |
| JP | 2001-141471 A | 5/2001 |
| JP | A 2001-239895 | 9/2001 |
| JP | A-10-2001-0112146 | 12/2001 |
| JP | A-2002-74922 | 3/2002 |
| JP | A-2002-181555 | 6/2002 |
| JP | A-2002-267461 | 9/2002 |
| JP | A 2002-328026 | 11/2002 |
| JP | A 2003-003554 | 1/2003 |
| JP | 2003-035554 A | 2/2003 |
| JP | 2003-037514 A | 2/2003 |
| JP | A 2003-166848 | 6/2003 |
| JP | A 2003-521825 | 7/2003 |
| JP | A-2003-308686 | 10/2003 |
| JP | 2003-315065 A | 11/2003 |
| JP | A 2004-234794 | 8/2004 |
| JP | 2005-173653 A | 6/2005 |
| JP | A 2005-524570 | 8/2005 |
| KR | 10-2003-0071743 A | 9/2003 |
| KR | 10-2004-0061642 A | 7/2004 |
| KR | 20-0372059 Y1 | 1/2005 |
| KR | 10-2005-0017296 A | 2/2005 |
| KR | 10-2005-0072425 A | 7/2005 |
| KR | 10-2006-0030344 A | 4/2006 |
| KR | 2006-128470 A | 12/2006 |
| WO | WO 98/39852 | 9/1998 |
| WO | WO 99/38728 | 8/1999 |
| WO | WO-2004/092840 A1 | 10/2004 |
| WO | WO 2006/130784 A2 | 12/2006 |

OTHER PUBLICATIONS

U.S. Appl. No. 11/645,642, filed Dec. 27, 2006.
U.S. Appl. No. 11/645,628, filed Dec. 27, 2006.
U.S. Appl. No. 11/646,539, filed Dec. 28, 2006.
U.S. Appl. No. 11/646,477, filed Dec. 28, 2006.
U.S. Appl. No. 11/646,566, filed Dec. 28, 2006.
U.S. Appl. No. 11/645,672, filed Dec. 27, 2006.
U.S. Appl. No. 11/646,557, filed Dec. 28, 2006.
U.S. Appl. No. 11/646,558, filed Dec. 28, 2006.
U.S. Appl. No. 11/646,498, filed Dec. 28, 2006.
U.S. Appl. No. 11/646,538, filed Dec. 28, 2006.
U.S. Appl. No. 11/646,479, filed Dec. 28, 2006.
Jan. 5, 2010 Office Action issued in U.S. Appl. No. 11/646,498.
M. Mukasa. "Detachable-Panel Connectors Respond to Needs for Anti-Theft Designs," JEE Journal of Electronic Engineering 30, Feb. 1993, No. 314, Tokyo, Japan.
Oct. 1, 2009 European Search Report issued in European application No. EP 07 12 2201.

* cited by examiner

ELECTRONIC APPARATUS AND ELECTRONIC SYSTEM

BACKGROUND OF THE INVENTION

1. Field of the Invention

This invention relates to electronic apparatuses and electronic systems, more particular, to an electronic apparatus to which a portable navigation apparatus is attached and an electronic system therefor.

2. Description of the Related Art

As conventional navigation apparatuses, there are widely known small-sized portable navigation apparatuses with simplified structure and portability (hereinafter, referred to as Portable Navi), also known as Personal Navigation Device (hereinafter, referred to as PND); and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, the navigation apparatuses with portability of the Portable Navi and high-accuracy guide function of the in-vehicle navigation apparatus have been studied.

Japanese Patent Application Publication No. 8-318792, Japanese Patent Application Publication No. 2002-328026, Japanese Patent Application Publication No. 2005-524570, and Japanese Patent Application Publication No. 2001-239895 disclose a configuration where a navigation portion can be detached from an in-vehicle apparatus mounted in a vehicle. By removing the navigation portion from the in-vehicle apparatus, the navigation portion can be used as a Portable Navi of a single unit. Also, as disclosed in Japanese Patent Application Publication No. 2003-166848, the navigation apparatus is taken out of the vehicle and can be used while walking. In addition, when mounted in a vehicle, the navigation apparatus is in a car-navigation mode, and when taken out of the vehicle, the navigation apparatus is in a person-navigation mode.

There is a need for detecting whether or not the portable apparatus is attached to the in-vehicle electronic apparatus, to which a portable apparatus such as Portable Navi is to be attached. Meanwhile, the in-vehicle electronic apparatus sometimes resets the portable apparatus. For this reason, a reset signal has to be transmitted to the portable apparatus. Therefore, when the portable apparatus is attached to the in-vehicle electronic apparatus, required are a connecting line for detecting whether or not the portable apparatus is attached and another connecting line for transmitting the reset signal. Accordingly, two connecting lines and connectors are needed, impeding the reduction in size and cost.

SUMMARY OF THE INVENTION

The present invention has been made in view of the above circumstances and provides an in-vehicle electronic apparatus and an in-vehicle electronic system, which size and cost can be reduced.

According to one aspect of the present invention, there is provided an electronic apparatus to which a portable-apparatus is attachable, the electronic apparatus including: a second connecting line connected to a first connecting line provided in the portable apparatus; a detector detecting an attachment of the portable apparatus, when the second connecting line is electrically connected to the first connecting line, and detecting a detachment of the portable apparatus, when the second connecting line is electrically disconnected from the first connecting line; and a resent transmitter transmitting a rest signal to the portable apparatus through the second connecting line and the first connecting line. This makes it possible to commonly use the connecting line for detecting the attachment of the portable apparatus and for resetting the portable apparatus. It is therefore possible to reduce the size and cost.

According to another aspect of the present invention, there is provided an electronic system having a portable apparatus and an electronic apparatus to which the portable apparatus is attachable, the electronic system including: a first connecting line provided in the portable apparatus; a second connecting line connected to the first connecting line and provided in the electronic apparatus; a detector provided in the electronic apparatus and detecting an attachment of the portable apparatus, when the second connecting line is electrically connected to the first connecting line, and detecting a detachment of the portable apparatus, when the second connecting line is electrically disconnected from the first connecting line; and a resent transmitter provided in the electronic apparatus and transmitting a rest signal to the portable apparatus through the second connecting line and the first connecting line. This enables the reduction in size and cost.

BRIEF DESCRIPTION OF THE DRAWINGS

Exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

Exemplary Embodiment

Figure 1A:
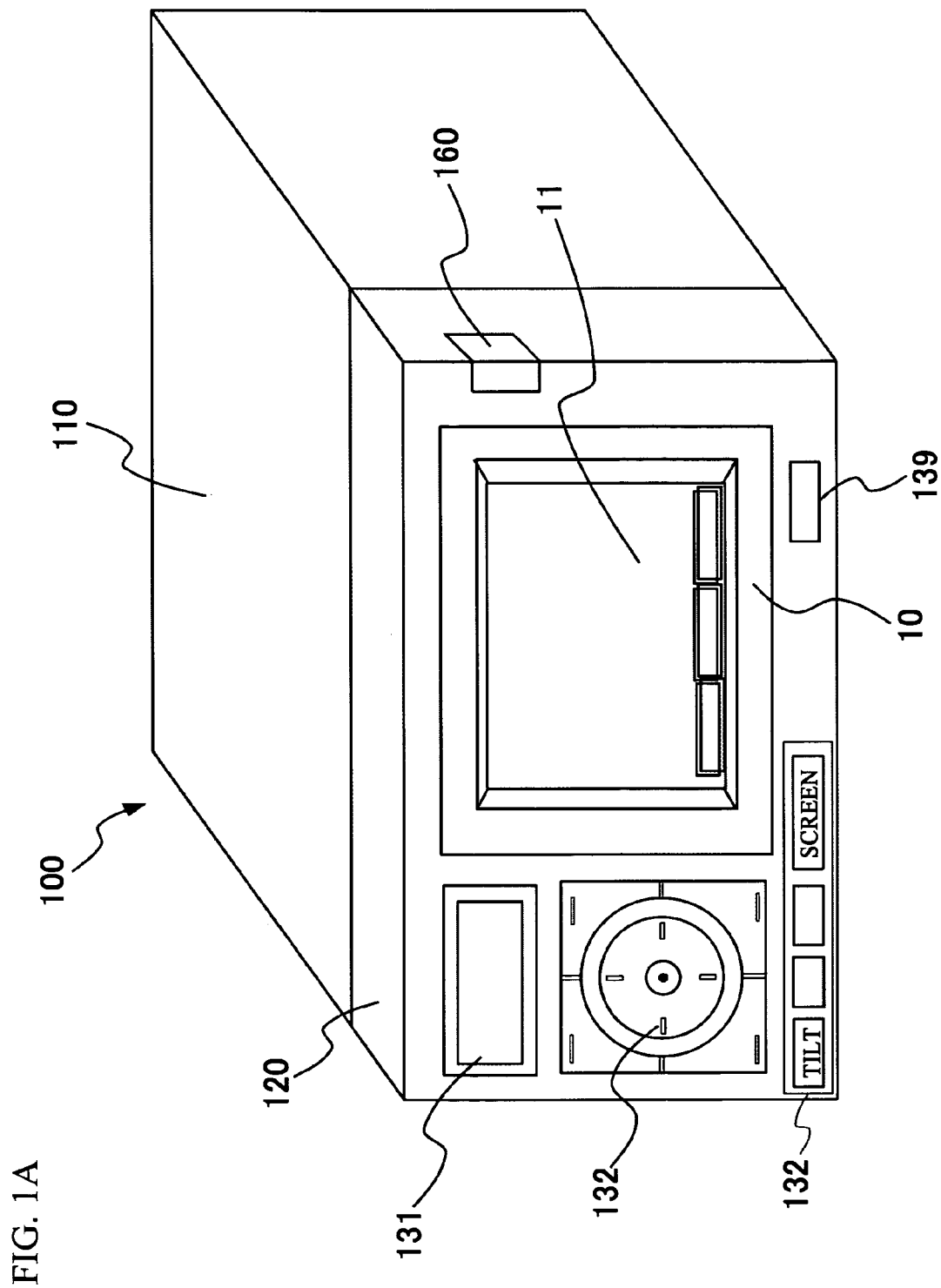
FIG. 1A and FIG. 1B show exterior views of an in-vehicle system employed in an exemplary embodiment of the present invention.
Figure 1B:
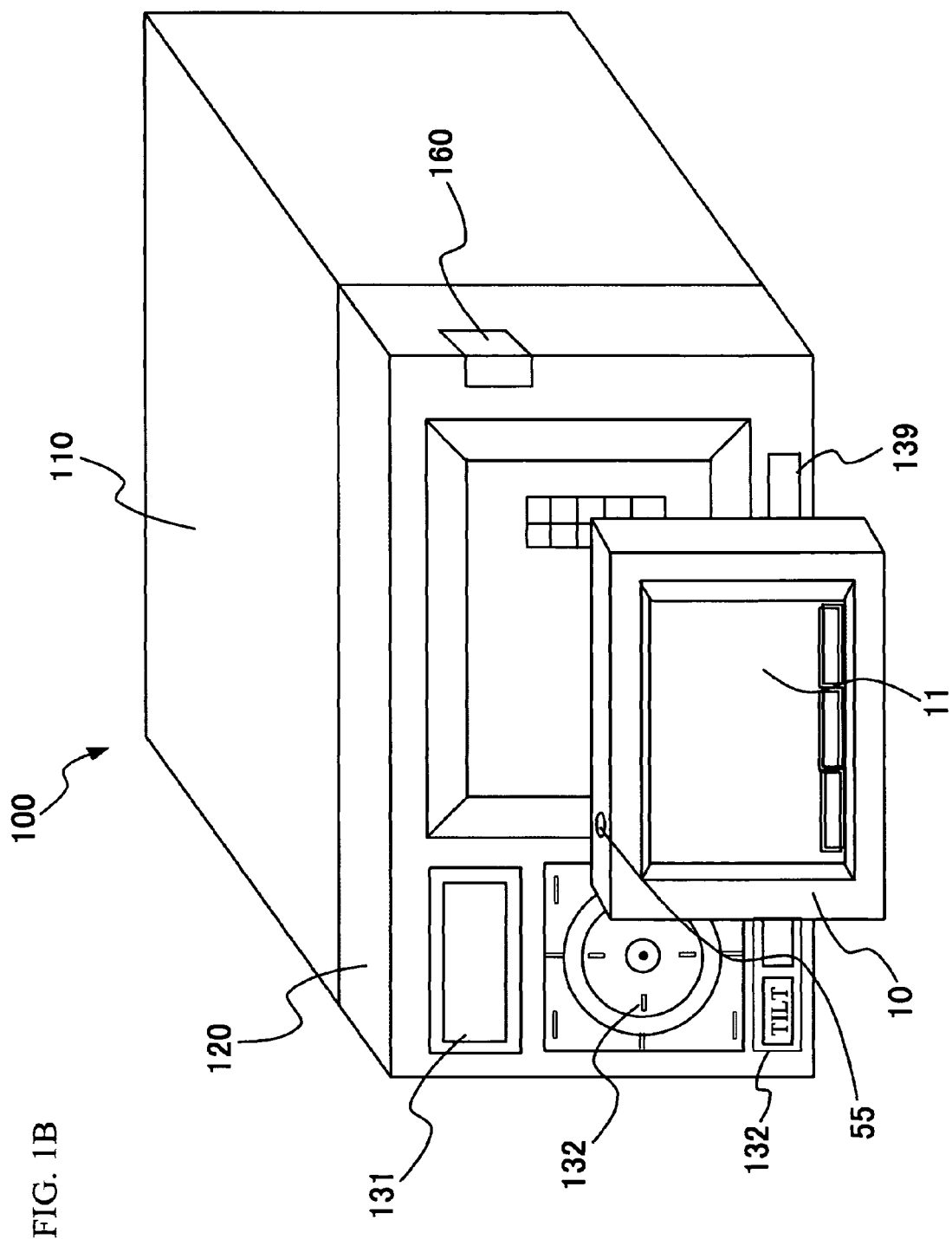

FIG. 1A and FIG. 1B show exterior views of an in-vehicle system 1. As shown in FIG. 1A and FIG. 1B, the in-vehicle system 1 is composed of: an in-vehicle apparatus 100 (in-vehicle electronic apparatus); and a portable apparatus 10 (portable navigation apparatus) with navigation capabilities. The portable apparatus 10 can be used after being attached at a front face portion 120 of the in-vehicle apparatus 100, as shown in FIG. 1A, and can be also used after being detached from the in-vehicle apparatus 100, as shown in FIG. 1B. In this manner, the portable apparatus 10 is detachable from the in-vehicle apparatus 100, and the portable apparatus 10 is attachable to the in-vehicle apparatus 100.

The in-vehicle apparatus 100 is capable of playing radio broadcasting or playing music data recorded on a memory medium such as a CD (Compact Disc) or the like, and the in-vehicle apparatus 100 includes: an in-vehicle apparatus main body 110 having a CD player and a CD insertion/ejection slot; and the front face portion 120 having a display portion 131 and an operating portion (main operating portion) 132.

The portable apparatus 10 has navigation capabilities of searching for a guiding path to a destination and displaying the searched guiding path over a map.

Figure 2:
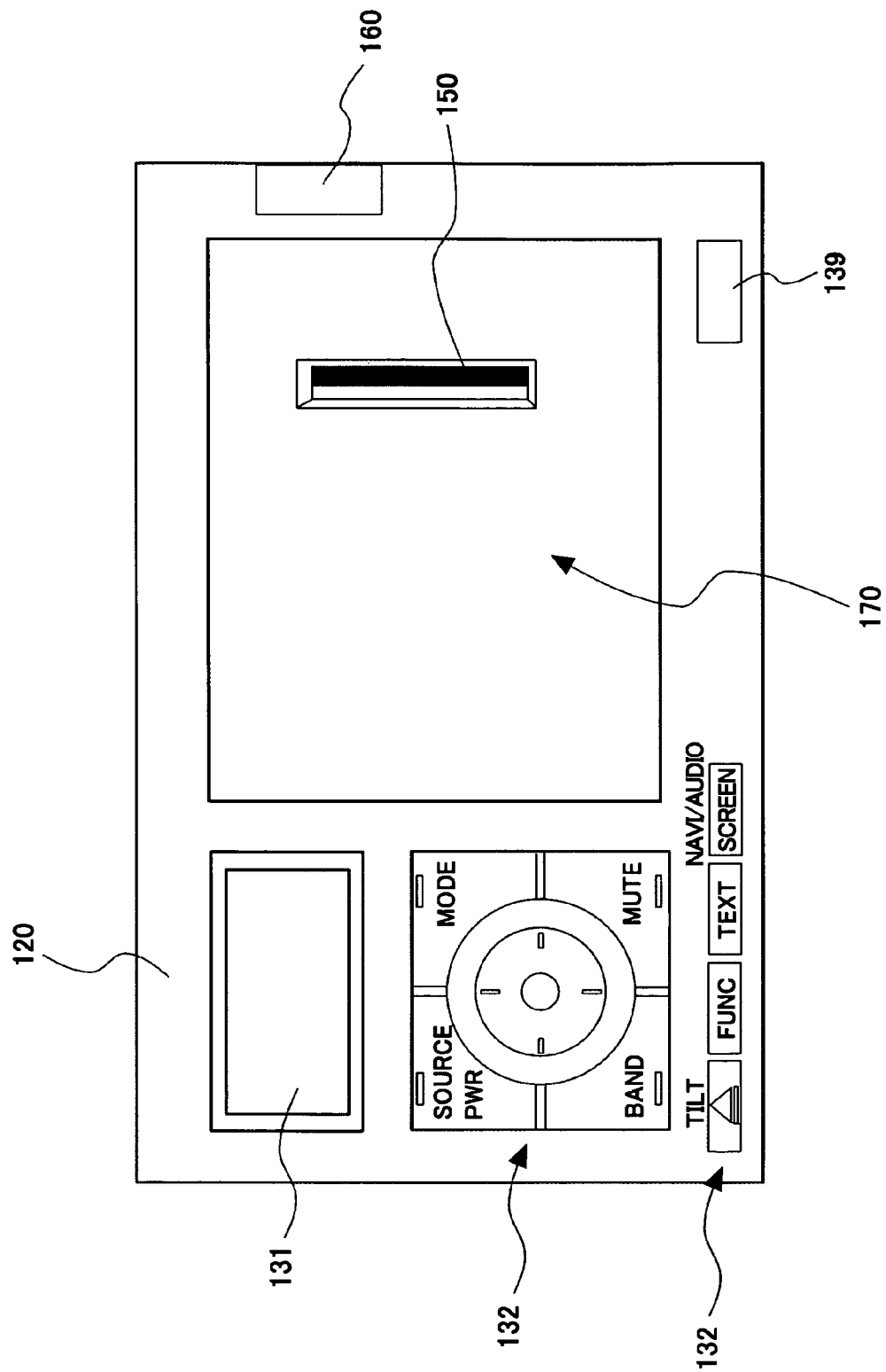
FIG. 2 shows a front face portion of the in-vehicle apparatus, from which the portable apparatus is removed.

FIG. 2 shows the front face portion 120 of the in-vehicle apparatus 100, from which the portable apparatus 10 is removed. There is provided an attached/detached portion 170 in which a recess portion is defined for attaching the portable apparatus 10, at the front face portion 120 of the in-vehicle apparatus 100. The attached/detached portion 170 is provided with: a connector 150 (housing portion side connector) for electrically coupling the in-vehicle apparatus 100 and the portable apparatus 10; and a lock mechanism (not shown) for securing the portable apparatus 10 to the front face portion 120. When a detach button 160 provided at the front face portion 120 is operated, a lock mechanism, not shown, is unlocked and the portable apparatus 10 is detachable from the in-vehicle apparatus 100.

Figure 3:
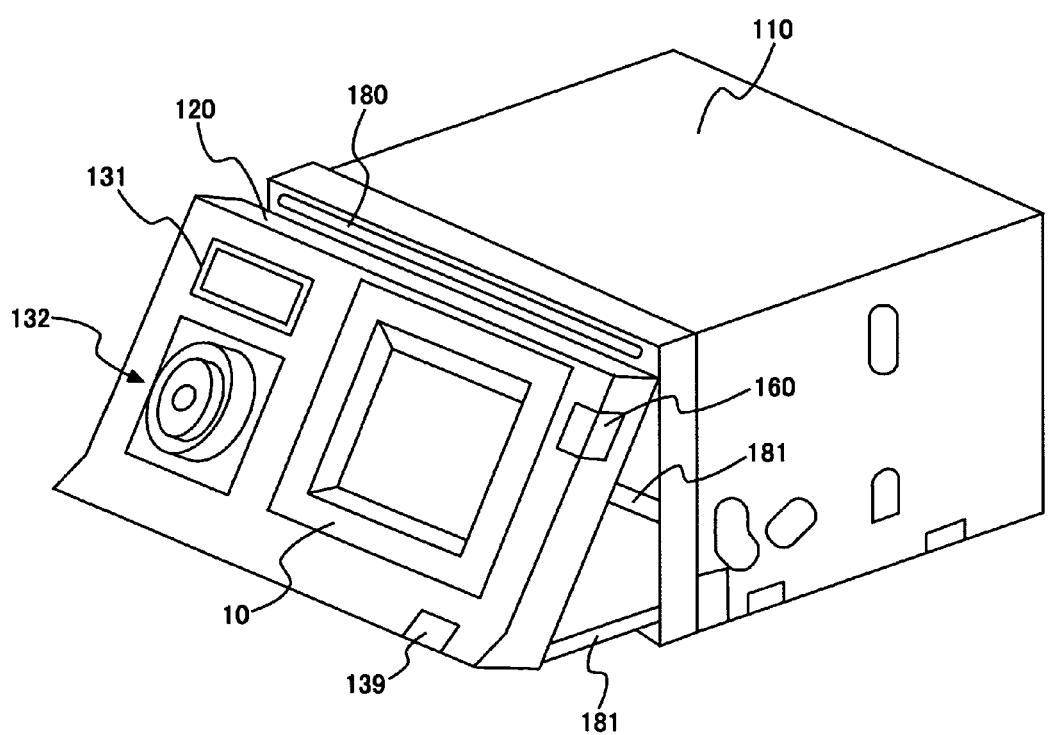
FIG. 3 is a view showing a state of tilting the front face portion against the main body of the in-vehicle apparatus to expose a CD insertion/ejection slot.

FIG. 3 shows a state of tilting the front face portion 120 against the in-vehicle apparatus main body 110 to expose a CD insertion/ejection slot 180.

By driving a slider 181 shown in FIG. 3 with a drive mechanism, not shown, the front face portion 120 can be tilted against the in-vehicle apparatus main body 110. By tilting operation, the CD insertion/ejection slot 180 provided in the in-vehicle apparatus main body 110 is exposed, so a CD can be inserted or ejected. There is provided an operation button (a tilt/eject button 132a shown in FIG. 6), at the front face portion 120 of the in-vehicle apparatus 100, and a tilt angle can be set according to the operation of the button.

Figure 4:
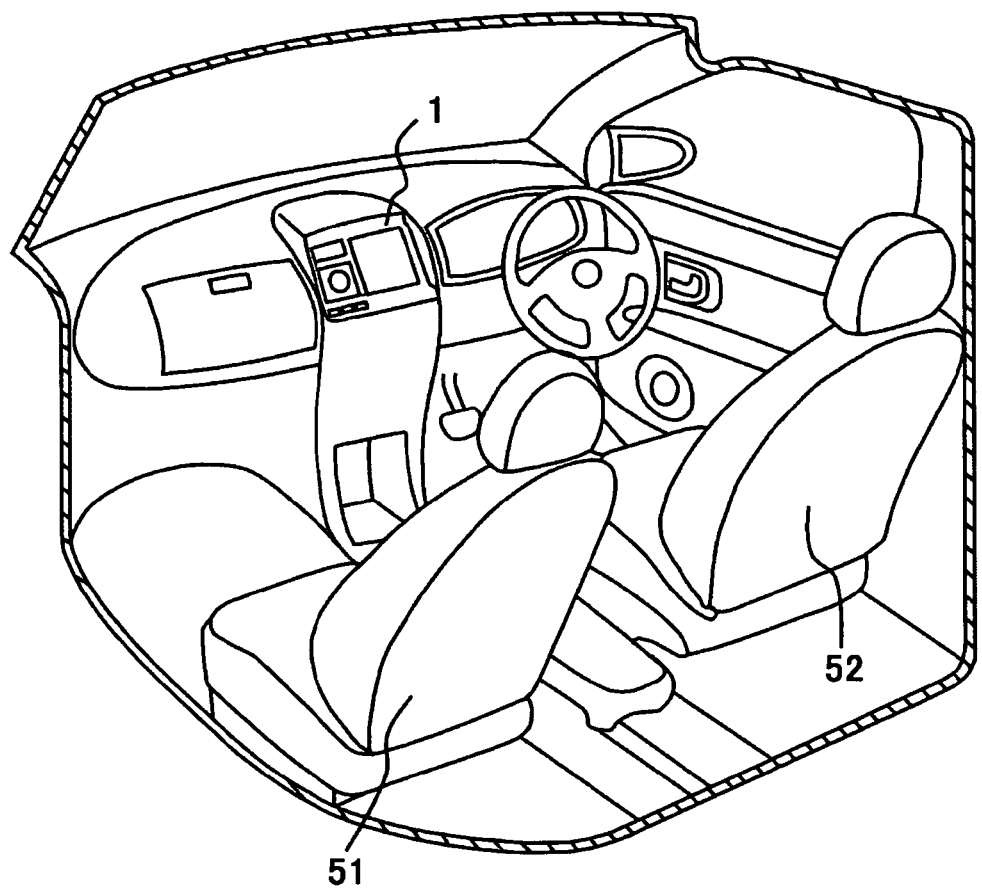
FIG. 4 shows a state of mounting the in-vehicle system in a vehicle.

FIG. 4 illustrates an example of mounting the in-vehicle system 1 in a vehicle.

The in-vehicle system 1 is disposed in a dashboard portion substantially in the middle of a front-passenger's seat 51 and a driver's seat 52, as shown in FIG. 4, for example.

Here, a GPS (Global Positioning System) antenna, not shown, of a GPS information receiver 133 is located on the dashboard or attached at an inner side of a front glass.

Figure 5:
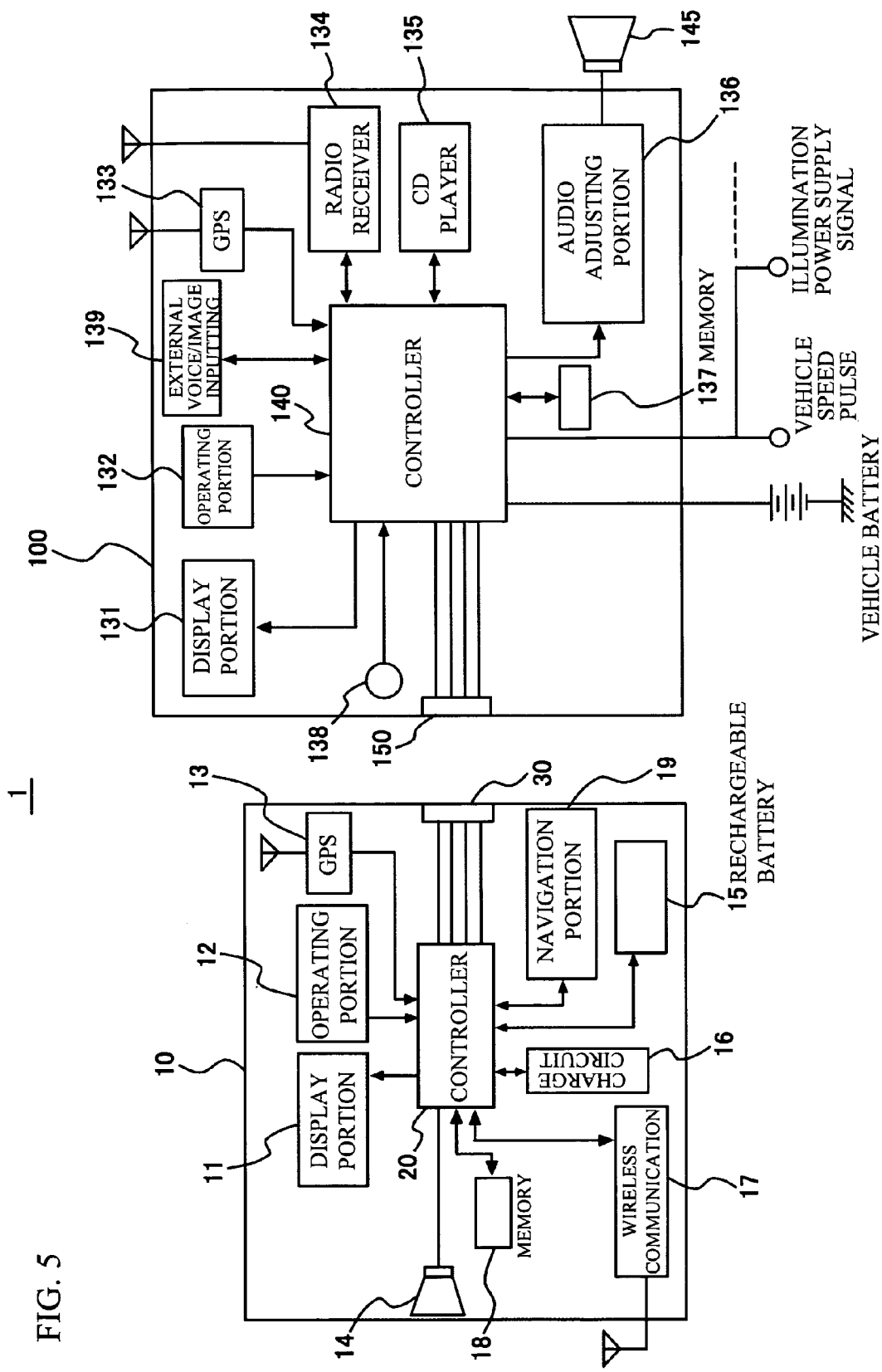
FIG. 5 is a block diagram showing a schematic configuration of the in-vehicle system.

FIG. 5 is a block diagram showing a schematic configuration of the in-vehicle system 1.

The in-vehicle apparatus 100 and the portable apparatus 10 are electrically connected by connectors. The connector 150 is provided at the in-vehicle apparatus 100 side, and a connector 30 (portable apparatus side connector) is provided at the portable apparatus 10. By connecting the connectors 150 and 30, various signals are sent and received between the in-vehicle apparatus 100 and the portable apparatus 10 to function as the in-vehicle system 1. The connectors 150 and 30 are respectively provided with power supply terminals for supplying power to the portable apparatus 10 from the battery of the vehicle. When the portable apparatus 10 is connected to the in-vehicle apparatus 100 and the power is supplied to the in-vehicle apparatus 100, the power is also supplied to the portable apparatus 10 via the power supply terminals.

The in-vehicle apparatus 100 is provided with: the display portion 131; the operating portion 132; the GPS information receiver 133; a radio receiver 134; a CD player 135; an audio adjusting portion 136; a memory 137; a microphone 138; an external voice/image inputting portion 139; a controller 140; and the connector 150. The in-vehicle apparatus 100 is activated by supplying the power from the battery of the vehicle, when the engine key is positioned at Acc or IG.

Hereinafter, the function of each part will be described in detail.

The display portion 131 is provided with a liquid crystal panel and a backlight, and displays a frequency of the received broadcasting, a track number of music being played, a music name being played, and the like, according to the 13-segment display.

Figure 6:
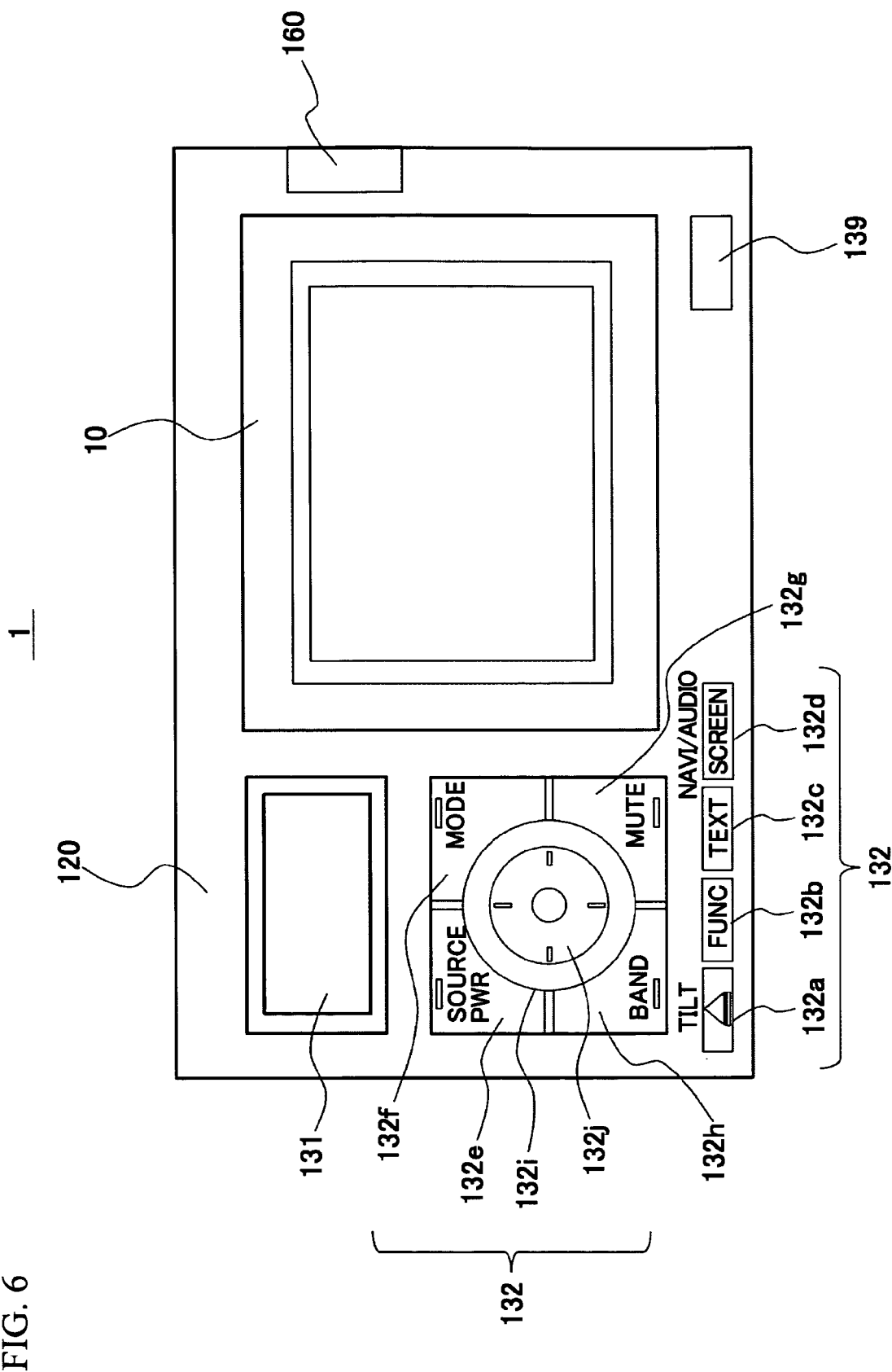
FIG. 6 is a front view of a main body.

The operating portion 132 is provided for selectively changing the operation mode of the in-vehicle apparatus 100, and for operating in various modes that have been changed. The operating portion 132 is provided with a group of buttons including: the tilt/eject button 132a; a function (represented as FUNC in the drawing)/AF button 132b; a TEXT button 132c; a SCREEN button 132d; a SOURCE/PWR button 132e; a MODE button 132f; a MUTE button 132g; a BAND change button 132h; a rotary button 132i; a cross key/enter key button 132j, as shown in FIG. 6.

Here, a description will be given of switching the display between the portable apparatus 10 and the in-vehicle apparatus 100.

Firstly, the in-vehicle apparatus 100 turns on when the SOURCE/POWER button 132e of the in-vehicle apparatus 100 is pushed. When the SOURCE/POWER button 132e is pushed for a short period of time while the portable apparatus 10 is on, the source is changed to the CD playing or radio broadcasting. At this time, the information on the selected source is displayed on the display portion 131 of the in-vehicle apparatus 100, and the navigation image is displayed on a display portion 11 of the portable apparatus 10, without relation to the source.

Next, when the SCREEN button 132d is pushed, the navigation image displayed on the display portion 11 of the portable apparatus 10 can be changed to an image corresponding to the source selected at the in-vehicle apparatus 100.

Figure 7A:
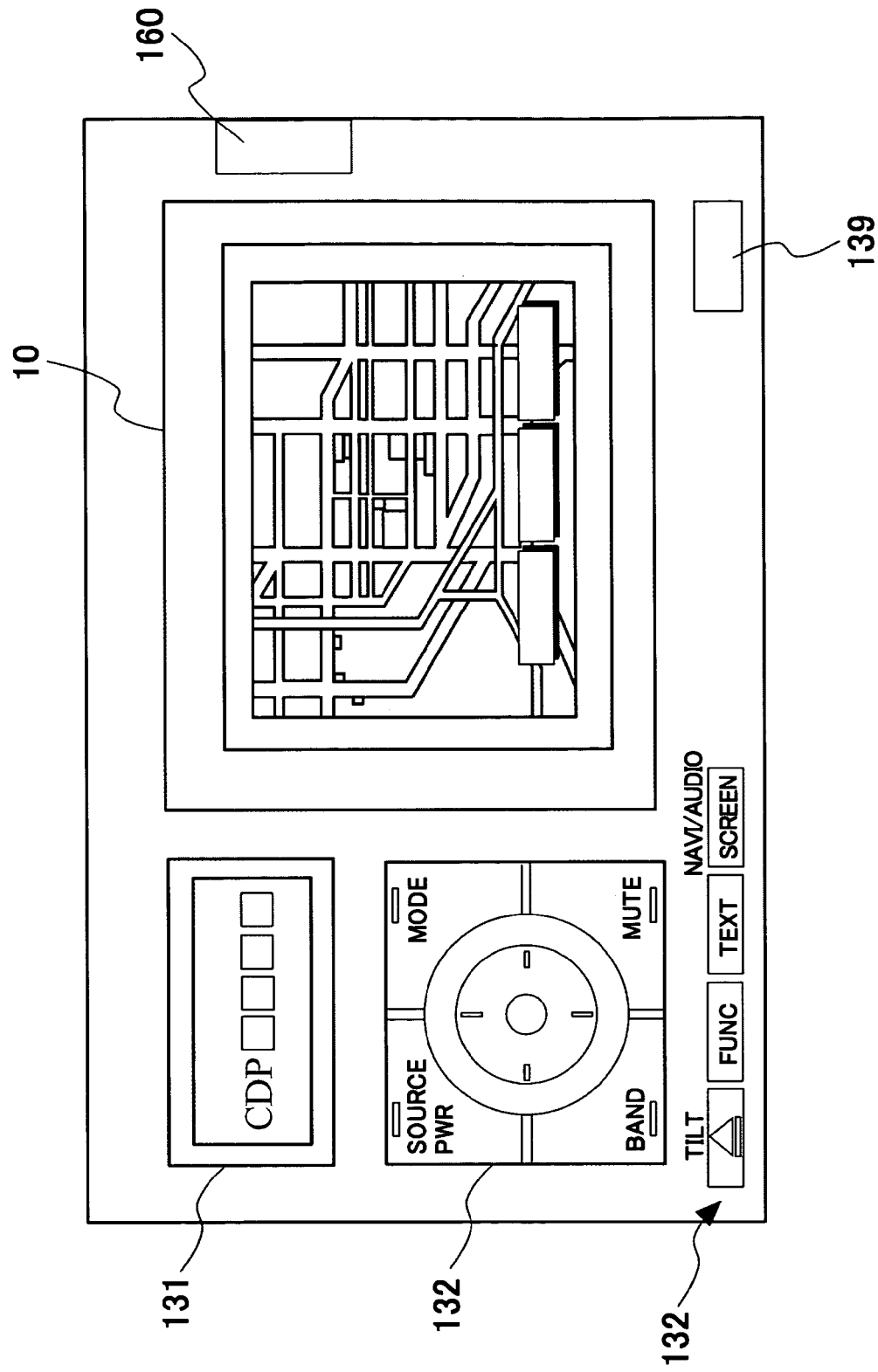
FIG. 7A through FIG. 7C show display examples of the portable apparatus attached to the main body.

FIG. 7A shows a state where the portable apparatus 10 is attached to the in-vehicle apparatus 100 while the CD is being played and a navigation image is being displayed on the portable apparatus 10.

Figure 7B:
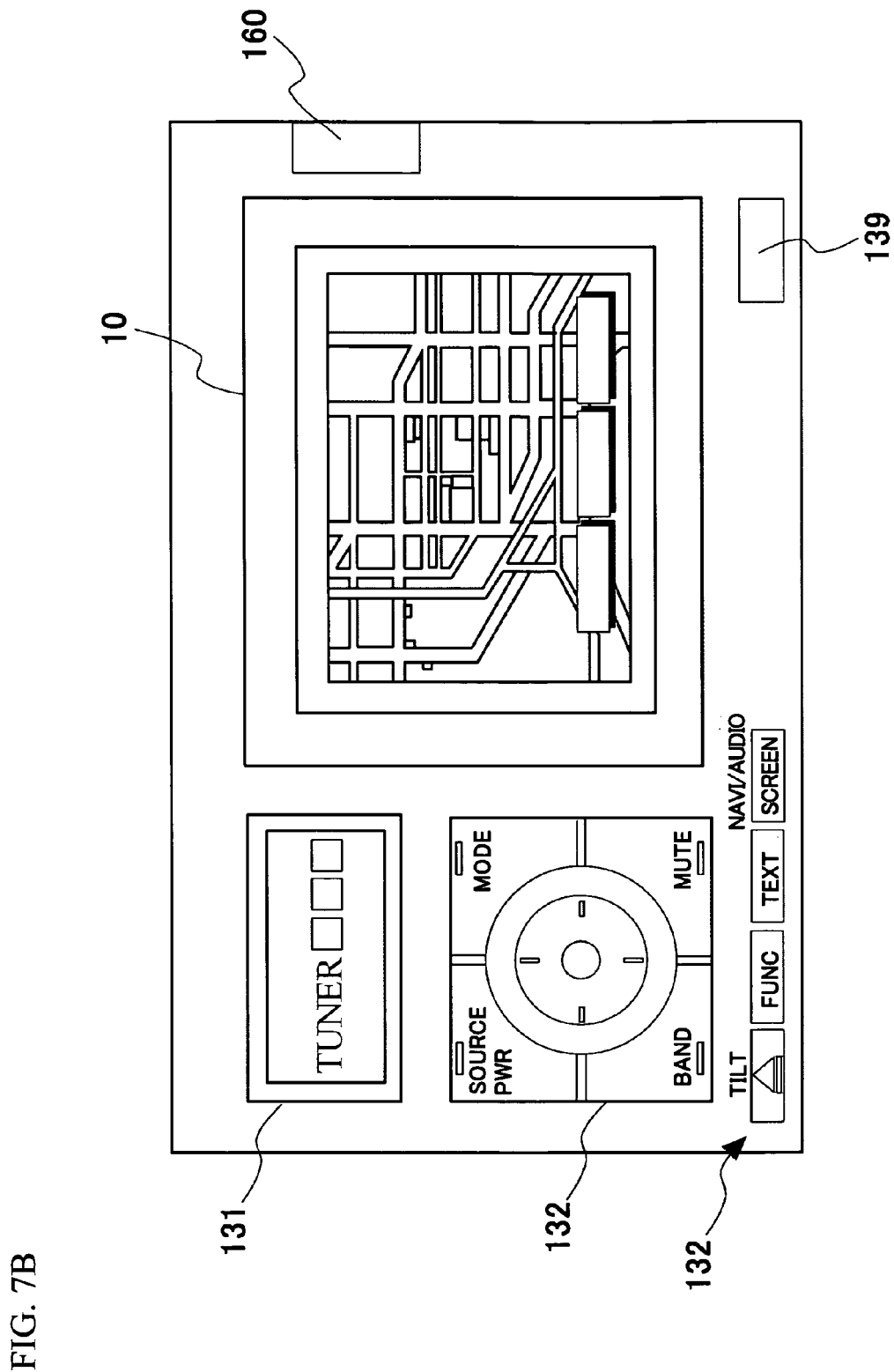

When the SOURCE/POWER button 132e is pushed in the state of FIG. 7A and the source is changed from the CD playing to the radio broadcasting, the information on the radio source is displayed on the display portion 131, as shown in FIG. 7B. Also, the navigation image remains being displayed on the display portion 11 of the portable apparatus 10.

Figure 7C:
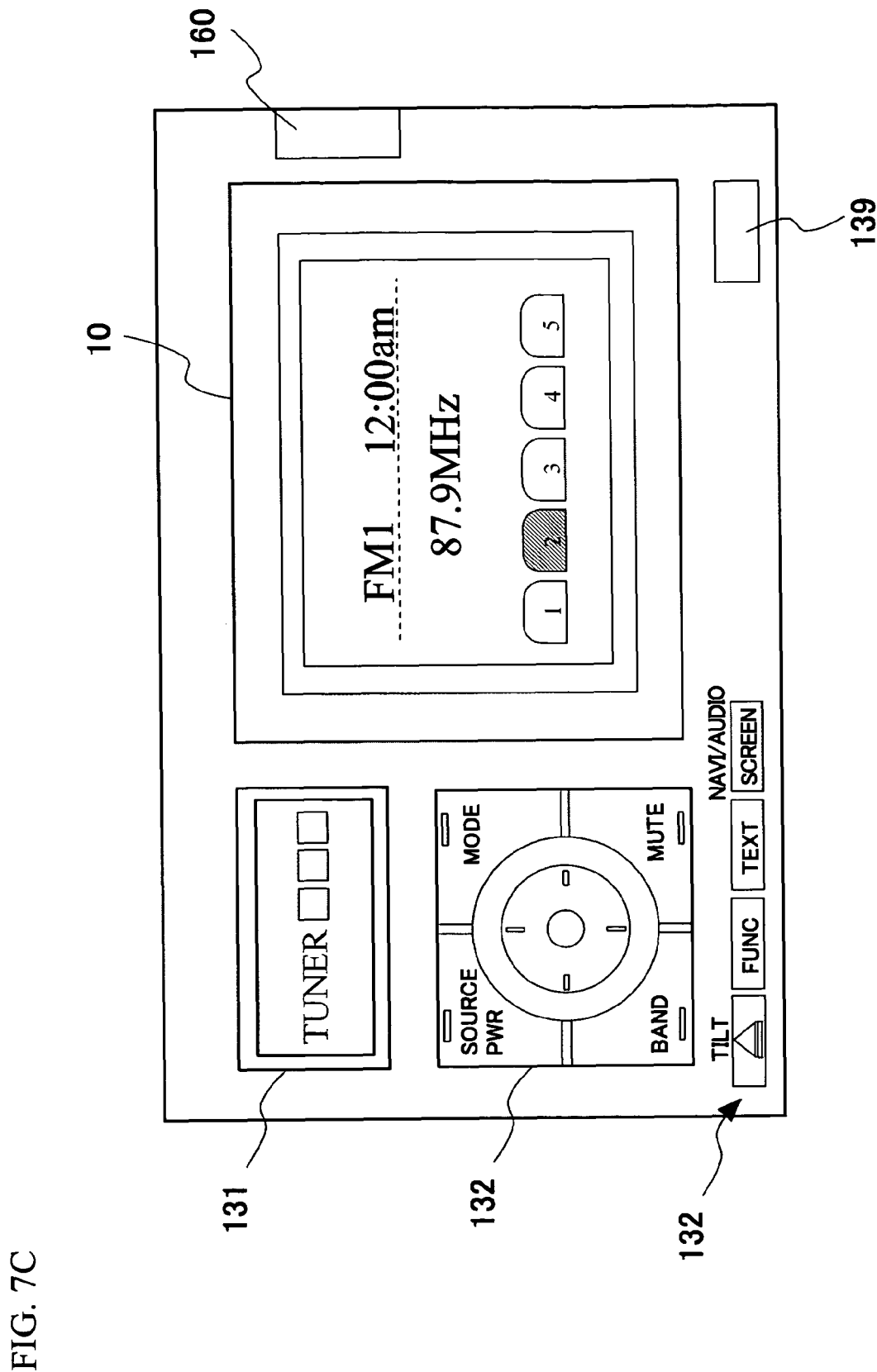

Then, when a user pushes the SCREEN button 132d, the image corresponding to the source being processed by the in-vehicle apparatus 100 is displayed on the display portion 11 of the portable apparatus 10, as shown in FIG. 7C (radio image is displayed in FIG. 7C). A touch panel, described later, is provided in the display portion 11 of the portable apparatus 10. A user is capable of operating the source currently being processed, by selecting the operation buttons displayed on the display portion 11.

In addition, when the SCREEN button 132d is pushed with the radio screen being displayed on the display portion 11, it is possible to return to the navigation image from the radio image, as shown in FIG. 7B. When the portable apparatus 10 is removed from the in-vehicle apparatus 100, the operation of the SCREEN button 132d is invalid.

Furthermore, when a USB (Universal Serial Bus) or the like is connected to the external voice/image inputting portion

139 with the portable apparatus 10 removed from the in-vehicle apparatus 100, it is possible to prevent the change to the USB source, even if the SOURCE/POWER button 132*e* is pushed.

Referring back to FIG. 5, the GPS information receiver 133 includes a GPS antenna and a tuner, and receives GPS signals from a satellite. The GPS signal received by the GPS information receiver 133 is output through the controller 140, the connector 150, the connector 30, and a controller 20, to a navigation portion 19 of the portable apparatus 10, and then the position of the vehicle in which the in-vehicle apparatus 100 having the portable apparatus 10 therein is determined based on the GPS signal.

Herein, the GPS signal may be output to the navigation portion of the portable apparatus 10 through the controller 140, instead of through the controller 20. Alternatively, the GPS information receiver 133 may be composed of the GPS antenna only, so that the GPS signal received by the GPS antenna may be output to the tuner of a GPS information receiver 13, described later, without through the controller 140 or the controller 20. Further alternatively, the GPS signal received by a GPS antenna may be output through the controller 20 to the tuner of the GPS information receiver 13 without through the controller 140. Various changes may be made as necessary.

The radio receiver 134 has an antenna and a tuner, receives broadcast waves such as AM broadcasting, FM broadcasting, and sound multiplex broadcasting, outputs stereo audio signals, receives and demodulates multiplex data, and outputs the demodulated signal to the controller 140.

The CD player 135 reproduces the data stored in the CD, and outputs the reproduced signal to the controller 140.

Herein, the demodulated signal output from the radio receiver 134 may be output to the audio adjusting portion 136, described later, without through the controller 140.

The audio adjusting portion 136 implements signal processing such as volume control or tone control on an audio signal received or demodulated by the radio receiver 134 or the audio signal reproduced by the CD player 135, and then outputs the processed signal to a speaker 145.

The memory 137 may be composed of a RAM (Random Access Memory) from which data is readable and into which data is writable, and temporarily stores information necessary for control.

The microphone 138 is provided for hands-free communication, and takes in user's voices in the vehicle.

The external voice/image inputting portion 139 is provided with a connection terminal with an external device such as a USB memory, portable audio device, or the like so that an audio signal or data from the external device may be input. The external voice/image inputting portion 139 then sends the signal or data to the controller 140, and outputs the audio signal, data, or the like to the external device connected.

The controller 140 controls the radio receiver 134, the CD player 135, and the audio adjusting portion 136, according to the operation by means of the operating portion 132.

Also, the controller 140 outputs various signals through the connector 150 to the portable apparatus 10, and controls the in-vehicle apparatus 100 on the basis of the various signals input from the portable apparatus 10. For example, the controller 140 outputs the GPS signal received by the GPS information receiver 133 or the audio signal input through microphone 138, to the portable apparatus 10 by way of the connector 150.

Here, the audio signal input through the microphone 138 may be output to the portable apparatus 10 by way of the connector 150, without through the controller 140.

In addition, the voice on communication over a mobile phone connected to the portable apparatus 10 is input through the connector 150 into the controller 140, and is then output through the audio adjusting portion 136 to the speaker 145.

Furthermore, the controller 140 acquires an operation signal corresponding to a menu image of various modes displayed on the display portion 11 of the portable apparatus 10, from the controller 20 of the portable apparatus 10, and then controls the radio receiver 134 and the CD player 135.

Also, the power is supplied to the controller 140 from the battery mounted in the vehicle. When the portable apparatus 10 is connected, the controller 140 outputs the power supplied from the battery to the portable apparatus 10.

Here, a vehicle speed pulse and an illumination power supply signal are input into the controller 140 from a vehicle. The controller 140 transfers such input vehicle speed pulse to the controller 20 of the portable apparatus 10. Meanwhile, the vehicle speed pulse may be configured not to be input into the in-vehicle apparatus 100.

Next, a description will be given of the portable apparatus 10. The portable apparatus 10 is provided with: the display portion 11; an operating portion 12; the GPS information receiver 13; a speaker 14; a rechargeable battery 15; a charge circuit 16; a wireless communication transmitter/receiver 17; a memory 18; the navigation portion 19; the controller 20; and the connector 30.

Hereinafter, functions of the components will be described in detail.

The display portion 11 is provided with a liquid crystal panel and a backlight, and is capable of displaying map information generated by the navigation portion 19 and guiding path information to a destination, the received broadcasting frequency transferred from the in-vehicle apparatus 100, a music track number played, music name played, and the like.

Here, the display portions 11 and 131 may employ a flat panel display other than a liquid crystal panel. Examples are organic light emitting display, plasma display panel, cold-cathode flat panel display, or the like.

The operating portion 12 includes a power button 55 (see FIG. 8A) for powering on or off the touch panel or the portable apparatus 10. The touch panel is, for example, disposed on the display screen. When the touch panel is touched by a finger or a dedicated pen, the touched position is detected to determine whether or not there is an input operation. The power button 55 will be described later in detail.

The GPS information receiver 13 includes an antenna and a tuner, and receives the GPS signal from a satellite. Such received GPS signal is output to the navigation portion 19, and the vehicle location is detected based on the GPS signal. Meanwhile, the in-vehicle apparatus 100 is also provided with the GPS information receiver 133. However, when the portable apparatus 10 is attached to the in-vehicle apparatus 100, the location of the vehicle, in which the in-vehicle apparatus 100 having the portable apparatus 10 is mounted, is specified by use of the GPS signal (and the vehicle speed pulse) received by the GPS information receiver 133. When the portable apparatus 10 is used alone, the location thereof is specified by use of the GPS signal received by the GPS information receiver 13.

The speaker 14 is provided for outputting the audio information of the navigation portion 19, and outputs the audio information only when the portable apparatus 10 is detached from the in-vehicle apparatus 100, namely, used alone separately.

The rechargeable battery 15 supplies power to each portion of the portable apparatus 10, when the portable apparatus 10 is detached from the in-vehicle apparatus 100. When the portable apparatus 10 is attached to the in-vehicle apparatus 100, the power is supplied through the power supply terminals of the connector 30 from the battery of the vehicle and the rechargeable battery 15 is charged by the charge circuit 16. Also, the charge circuit 16 is supplied with the power from the connection terminal through a USB slot 57 (see FIG. 8A), and the rechargeable battery 15 can be charged.

The wireless communication transmitter/receiver 17 sends and receives the voice on communication over a mobile phone, and acquires the information used for navigation over the mobile phone. For example, Bluetooth, which is a wireless transmission system at 2.4 GHz band, is used for the wireless communication transmitter/receiver 17.

The memory 18 may be a RAM from which data is readable and into which the data is writable, and temporarily stores the information read for each control.

The navigation portion 19 includes a map information storing portion that acquires from an SD (Secure Digital) card or a USB memory, described later, and stores the map information used for navigation, determines current location information with GPS signal from the GPS information receiver 133 or the GPS information receiver 13, and creates a map image for navigation. The created map image may be displayed on the display portion 11. In addition, when the in-vehicle apparatus 100 and the portable apparatus 10 are connected, the vehicle speed pulse is acquired from the vehicle so that the accuracy of the location detection of the vehicle can be improved. Optionally, the map information may be retained in the portable apparatus 10.

The controller 20 controls each part of the portable apparatus 10. Also, the controller 20 outputs various signals to the in-vehicle apparatus 100 through the connector 30, and controls the portable apparatus 10 based on the various signals input from the in-vehicle apparatus 100. For example, the controller 20 acquires the GPS signal received by the GPS information receiver 133 of the in-vehicle apparatus 100 and the vehicle speed pulse, and outputs to the navigation portion 19. Also, the controller 20 acquires the audio signal input by the microphone 138 of the in-vehicle apparatus 100 from the controller 140 of the in-vehicle apparatus 100, and controls the navigation portion 19 according to the audio signal acquired. That is to say, the navigation portion 19 can be operated in a hands-free manner. The voice on communication over the mobile phone connected to the wireless communication transmitter/receiver 17 is output to an in-vehicle apparatus side through the connector 30, and is caused to output from the speaker 145 of the in-vehicle apparatus 100. The operation signal on the menu screen or content screen displayed on the display portion 11 is output to the controller 140 of the in-vehicle apparatus 100 through the connector 30. The controller 140 controls the radio receiver 134 or the CD player 135 according to the operation signal transmitted from the controller 20 of the portable apparatus 10.

Figure 8A:
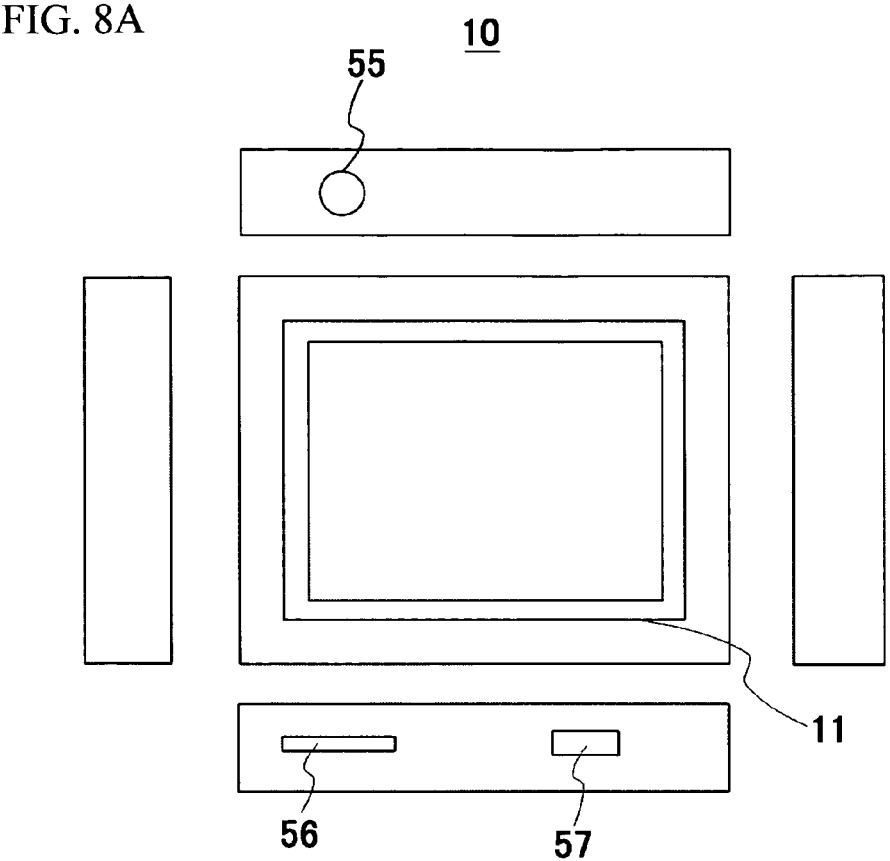
FIG. 8A shows a front view, top view, bottom view, left-side view, and right-side view of the portable apparatus.
Figure 8B:
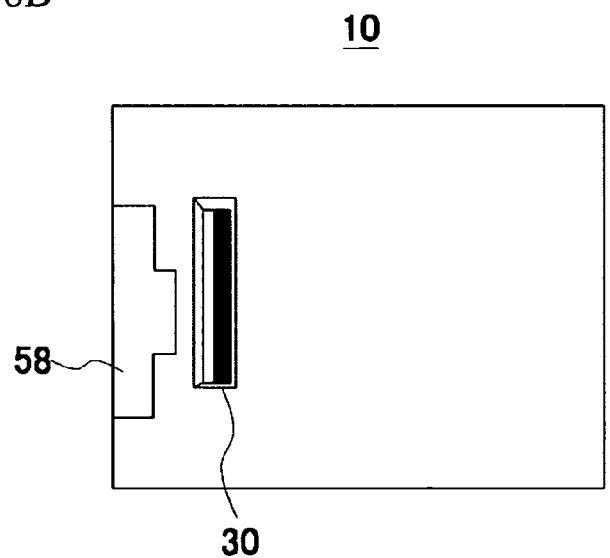
FIG. 8B is a back view of the portable apparatus.

FIG. 8A shows a front view, top view, bottom view, left-side view, and right-side view of the portable apparatus 10. FIG. 8B is a back view of the portable apparatus 10.

The top face of the portable apparatus 10 is provided with the power button 55 for turning on or off the power of the portable apparatus. The bottom face of the portable apparatus 10 is provided with: an SD memory card slot 56; and the USB slot 57. By inserting the SD card or the USB memory storing the map information into the slots, the controller 20 reads the map information from the SD card or the USB memory and outputs the map information to the navigation portion 19.

The power of the portable apparatus 10 is turned on or off by the control of the in-vehicle apparatus 100, when the portable apparatus is attached to the in-vehicle apparatus 100.

In addition, when the portable apparatus 10 is removed from the in-vehicle apparatus 100 and used alone, the power is operated on the basis of the on and off operations of the power button 55.

At a backside of the portable apparatus 10, there are provided: the connector 30 electrically connected with the in-vehicle apparatus 100; and an engagement portion 58 to be engaged with a lock mechanism (not shown) provided at the in-vehicle apparatus 100 side.

Figure 9:
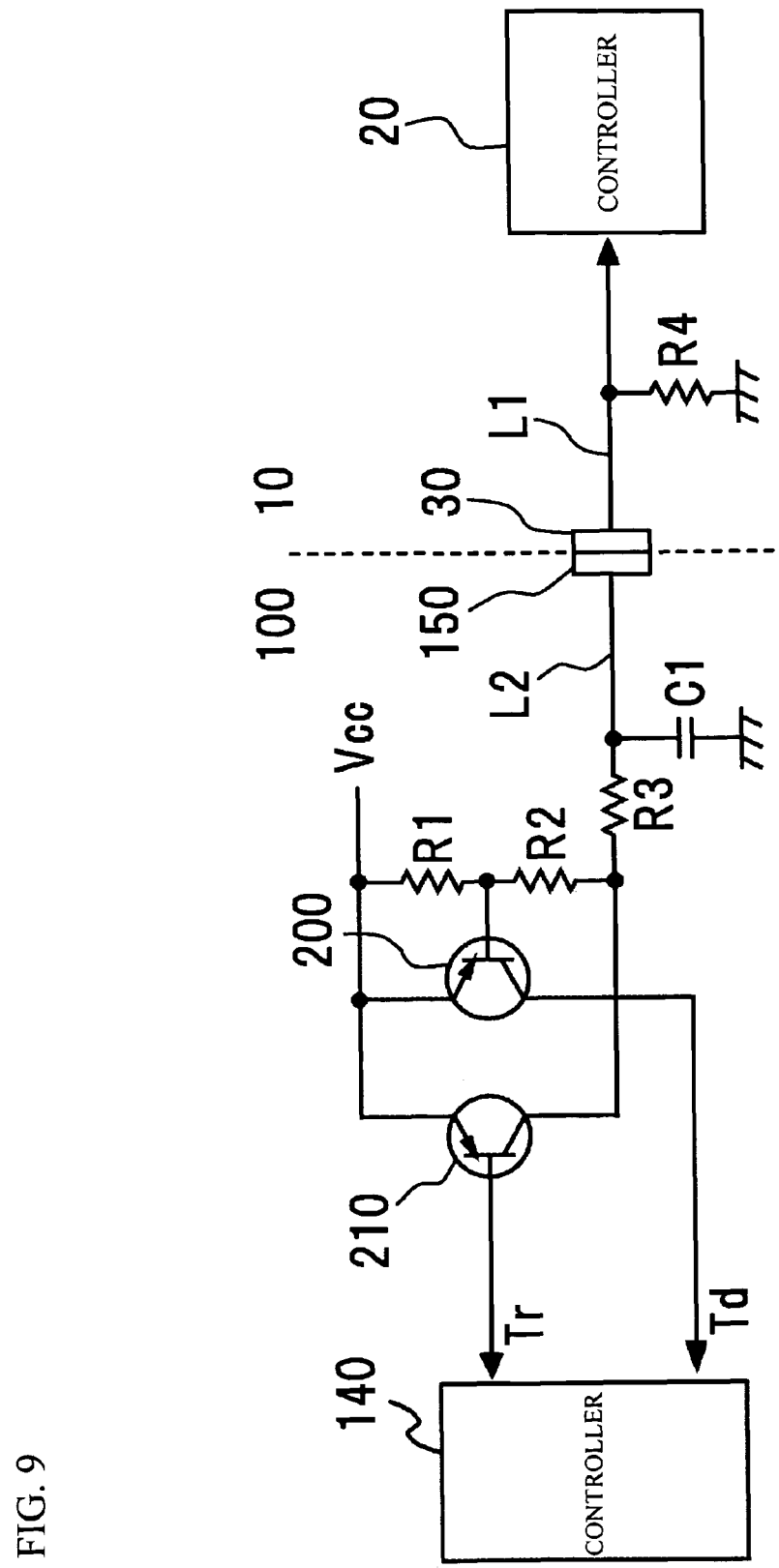
FIG. 9 is a circuit diagram for detecting whether the portable apparatus is attached to the in-vehicle apparatus.

FIG. 9 is a circuit diagram for detecting whether the portable apparatus 10 is attached to the in-vehicle apparatus 100. Referring to FIG. 9, the right-hand side of the dotted line represents the portable apparatus 10 and the left-hand side of the dotted line represents the in-vehicle apparatus 100. The portable apparatus 10 and the in-vehicle apparatus 100 are connected by the connectors 30 and 150. In the portable apparatus 10, the connector 30 is connected to a first connecting line L1, and the first connecting line L1 is connected to the controller 20. A resistor R4 is connected between the first connecting line L1 and ground.

In the in-vehicle apparatus 100, the connector 150 is connected to a second connecting line L2. The second connecting line L2 is grounded through a capacitor C1 for noise removal. Resistors R1, R2, and R3 are connected in series between the power supply line Vcc and the second connecting line L2. The emitter of a PNP bipolar transistor 200 is connected to the power supply line Vcc, the base thereof is connected to the node between the resistors R1 and R2, and the collector thereof is connected to the controller 140, as a sensing terminal Td. The emitter of a PNP bipolar transistor 210 is connected to the power supply line Vcc, the base thereof is connected to the controller 140, as a reset terminal Tr, and the collector thereof is connected to the second connecting line L2 through the resistor R3.

The resistance values of the resistors R1, R2, R3, and R4 may be respectively, for example, 68 kΩ, 68 kΩ, 100Ω, and 4.7 kΩ. The capacitance value of the capacitor C1 may be, for example, 220 pF. The voltage of the power line Vcc may be, for example, 3.3 V.

A description will next be given of the operation of detecting the attachment of the portable apparatus 10. Table 1 shows connection/non-connection between the first connecting line L1 and the second connecting line L2, namely, high level (H)/low level (L) of the second connecting line L2 and the sensing terminal Td with respect to the attachment/detachment of the portable apparatus 10. The resistors R3 and R4 are smaller than the resistors R1 and R2. Therefore, when the first connecting line L1 is in connection with the second connecting line L2, the voltage of the power supply line Vcc is mostly supplied to the resistors R1 and R2. This causes the first connecting line L1 and the second connecting line L2 to be at the ground level, namely, low level (L). In addition, since the resistance value of the resistor R1 is substantially equal to that of the resistor R2, the base of the transistor 200 has a negative potential with respect to the emitter thereof. This switches on the transistor 200, and causes the sensing terminal Td to be at the power supply level, namely, high level (H). On the other hand, when the first connecting line L1 is not in connection with the second connecting line L2, the second connecting line L2 is opened. Accordingly, the second connecting line L2 is at the high level (H) and the base of the transistor 200 substantially has the same potential as that of the emitter thereof. For this reason, the transistor 200 switches off, and the sensing terminal Td is at the low level (L). Here, although not shown, if the transistor 200 is switched off, the sensing terminal Td is at the ground level, namely, the low level, via another path.

TABLE 1

|  | L2 | Td |
| --- | --- | --- |
| Connection | L | H |
| Non-connection | H | L |

Then, a description will be given of the operation of resetting the portable apparatus 10. Table 2 shows levels of the second connecting line L2 and the first connecting line L1 with respect to the level of the reset terminal Tr. The rest terminal Tr is generally at the high level (H). When the reset terminal Tr is at the high level (H), the transistor 210 is turned off. This case corresponds to the connection in Table 1, and the second connecting line L2 and the first connecting line L1 are at the low level (L). Meanwhile, when the reset terminal Tr is at the low level (L), the transistor 210 turns on. Accordingly, the second connecting line L2 and the first connecting line L1 are at the high level (H). When the first connecting line is at the high level, the controller 20 resets the portable apparatus 10.

TABLE 2

| Tr | L2 | L1 |
| --- | --- | --- |
| H | L | L |
| L | H | H |

Here, the reset terminal Tr is at the low level, in other words, the reset signal is transmitted, the second connecting line L2 is at the high level and the sensing terminal Td becomes at the low level (L). In this manner, the sensing terminal Td will be in the same state as a case where the portable apparatus 10 is detached. Therefore, the controller 140 preferably determines that the portable apparatus 10 is attached, even if the sensing terminal Td is at the low level when the reset terminal Tr is at the low level.

In accordance with the first exemplary embodiment, as shown in FIG. 9, the in-vehicle apparatus 100 (in-vehicle electronic apparatus) includes: the second connecting line L2; the transistor 200 (detector); and the transistor 210 (reset transmitter). The second connecting line L2 is connected to the first connecting line L1 provided at the portable apparatus 10 (portable apparatus). When the second connecting line L2 is electrically connected with the first connecting line L1, the transistor 200 detects the attachment of the portable apparatus 10 and outputs a high level to the sensing terminal Td. Also, when the second connecting line L2 is electrically disconnected from the first connecting line L1, the transistor 200 detects the detachment of the portable apparatus 10 and outputs a low level to the sensing terminal Td. The transistor 210 transmits the reset signal to the portable apparatus 10 through the second connecting line L2 and the first connecting line L1.

This reset signal is used for initializing the operation of a microcomputer (the controller 20) of the portable apparatus 10, if the microcomputer goes out of control. As a timing when the reset signal is transmitted from the in-vehicle apparatus 100 to the portable apparatus 10, for example, there is a case where the in-vehicle apparatus 100 detects that the portable apparatus 10 goes out of control and transmits the reset signal to the portable apparatus 10, or there is a case where a user realizes that the portable apparatus 10 goes out of control (for example, the screen does not change, or the like) and operates a reset button of the in-vehicle apparatus 100.

As described heretofore, the in-vehicle apparatus 100 detects the attachment of the portable apparatus 10 by use of the second connecting line L2 and the first connecting line L1, and the reset signal is transmitted to the portable apparatus 10 by use of the second connecting line L2 and the first connecting line L1. This makes it possible to reduce to one connecting line and one connector so as to connect the portable apparatus 10 and the in-vehicle apparatus 100. Accordingly, it is possible to reduce the size and cost of the portable apparatus 10 and the in-vehicle apparatus 100.

In addition, as shown in Table 1, when the second connecting line L2 is in connection with the first connecting line L1, it is preferable that the second connecting line L2 become at a low level. This can suppress current flowing across the resistor R4 and suppress the increased consumption current.

Further, as shown in Table 2, when transmitting the reset signal, the second connecting line L2 preferably becomes at a high level. This enables the second connecting line L2 to be at a low level in a state where the portable apparatus 10 is attached. Therefore, the consumption current can be suppressed as described above.

In accordance with the present exemplary embodiment, a description has been given of an in-vehicle system composed of the in-vehicle apparatus 100 and the portable apparatus 10. However, the present invention is not limited to the in-vehicle apparatus. In addition, the portable apparatus 10 may be composed of a mobile phone with navigation capabilities, portable digital assistance (PDA), or the like. Further, instead of the CD insertion/ejection slot 180 and the CD player 135, there may be provided an insertion/ejection slot and a player of a memory medium such as MD (Mini Disc), DVD (Digital Versatile Disc), memory card, or the like, and there may be provided multiple types of insertion/ejection slots and players.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An electronic apparatus to which a portable apparatus is attachable, the electronic apparatus comprising:
    a second connecting line connected to a first connecting line provided in the portable apparatus;
    a detector detecting an attachment of the portable apparatus by use of the first connecting line and the second connecting line, when the second connecting line is electrically connected to the first connecting line, and detecting a detachment of the portable apparatus by use of the first connecting line and the second connecting line, when the second connecting line is electrically disconnected from the first connecting line; and
    a reset transmitter transmitting a reset signal to the portable apparatus through the second connecting line and the first connecting line, the reset signal initializing an operation of a microcomputer of the portable apparatus.

2. The electronic apparatus as claimed in claim 1, wherein a ground voltage is applied to the second connecting line when in connection with the first connecting line, and is opened when in disconnection from the first connecting line.

3. The electronic apparatus as claimed in claim 2, wherein a voltage of a power supply is applied to the second connecting line when the reset signal is transmitted.

4. The electronic apparatus as claimed in claim 1, wherein the portable apparatus is a portable navigation apparatus.

5. An electronic system having a portable apparatus and an electronic apparatus to which the portable apparatus is attachable, the electronic system comprising:

a first connecting line provided in the portable apparatus;

a second connecting line connected to the first connecting line and provided in the electronic apparatus;

a detector provided in the electronic apparatus and detecting an attachment of the portable apparatus by use of the first connecting line and the second connecting line, when the second connecting line is electrically connected to the first connecting line, and detecting a detachment of the portable apparatus by use of the first connecting line and the second connecting line, when the second connecting line is electrically disconnected from the first connecting line; and a reset transmitter provided in the electronic apparatus and transmitting a reset signal to the portable apparatus through the second connecting line and the first connecting line, the reset signal initializing an operation of a microcomputer of the portable apparatus.

\* \* \* \* \*